(12) United States Patent
Voss et al.

(10) Patent No.: US 12,498,258 B2
(45) Date of Patent: Dec. 16, 2025

(54) MAGNETIC DISPLACEMENT MEASUREMENT UNIT, TRANSPORTING DEVICE AND METHOD

(71) Applicant: TURCK Holding GmbH, Halver (DE)

(72) Inventors: Christian Voss, Lüdenscheid (DE); Raphael Penning, Duisburg (DE); Markus Bregulla, Krefeld (DE)

(73) Assignee: TURCK Holding GmbH, Halver (DE)

( * ) Notice: Subject to any disclaimer, the term of this patent is extended or adjusted under 35 U.S.C. 154(b) by 779 days.

(21) Appl. No.: 17/807,780

(22) Filed: Jun. 20, 2022

(65) Prior Publication Data

US 2022/0411237 A1    Dec. 29, 2022

(30) Foreign Application Priority Data

Jun. 25, 2021  (DE) .......................... 102021116521.0

(51) Int. Cl.
  *G01D 5/48* (2006.01)
  *B61L 25/00* (2006.01)
  (Continued)

(52) U.S. Cl.
  CPC .............. *G01D 5/485* (2013.01); *B61L 25/00* (2013.01); *B61L 25/025* (2013.01); *G01D 5/145* (2013.01)

(58) Field of Classification Search
  CPC ........ B61L 25/00; B61L 25/025; B61L 3/125; B61L 25/026; G01D 5/485; G01D 5/145; G01D 5/2013

(Continued)

(56) References Cited

U.S. PATENT DOCUMENTS 8,497,764 B2 *  7/2013  Finkler ................. G01B 7/003
                                                             138/135

FOREIGN PATENT DOCUMENTS

DE        2124089 A     12/1972
DE        2617943 A1    10/1977
(Continued)

OTHER PUBLICATIONS

Extended European Search Report in EP Appl. No. 22174975.7 mailed Oct. 26, 2022, 10 pages.
(Continued)

*Primary Examiner* — S. Joseph Morano
*Assistant Examiner* — Heaven R Buffington
(74) *Attorney, Agent, or Firm* — Kowert, Hood, Munyon, Rankin & Goetzel, P.C; Gentry C. McLean; Dean M. Munyon

(57) ABSTRACT

The present disclosure relates to displacement measurements using magnetic displacement measurement units. In various embodiments, the disclosed displacement measurement unit is configured to determine a displacement position of a vehicle along a guideway. In various embodiments, the displacement measurement unit includes a set of locator devices that are distributed at fixed displacement positions along the guideway, where a given locator device includes a magnetic element configured to produce a corresponding magnetic field. Further, in various embodiments, the displacement measurement unit includes a position sensor that is attached to the vehicle, where the position sensor is configured to detect a magnetic field produced one or more of the locator devices when the position sensor is brought within a detection range of one or more locator devices.

20 Claims, 4 Drawing Sheets

(51) Int. Cl.
*B61L 25/02* (2006.01)
*G01D 5/14* (2006.01)

(58) Field of Classification Search
USPC ........ 246/249; 324/179, 200, 207.11, 207.26
See application file for complete search history.

(56) References Cited

FOREIGN PATENT DOCUMENTS

| | | | | |
|---|---|---|---|---|
| DE | 3825097 A1 | 2/1990 | | |
| DE | 3910873 A1 | 10/1990 | | |
| DE | 202007012798 U1 | 2/2009 | | |
| DE | 102009041483 A1 | 3/2011 | | |
| DE | 102011000486 A1 * | 8/2012 | ........... | G01D 5/2492 |
| DE | 102019118767 A1 * | 1/2021 | | |
| WO | 2005/120922 A1 | 12/2005 | | |
| WO | 2012/079601 A1 | 6/2012 | | |

OTHER PUBLICATIONS

Search Report in DE Appl. No. 10 2021 116 521.0 mailed Feb. 14. 2022, 9 pages.

* cited by examiner

MAGNETIC DISPLACEMENT MEASUREMENT UNIT, TRANSPORTING DEVICE AND METHOD

PRIORITY CLAIM

The present application claims priority under 35 U.S.C. § 119 to German patent application 10 2021 116 521.0, filed Jun. 25, 2021, the disclosure of which is incorporated by reference herein in its entirety.

BACKGROUND

Technical Field

This disclosure relates generally to displacement measurement, and more particularly to various embodiments of magnetic displacement measurement units, transporting devices, and methods.

Description of the Related Art

There are various techniques for measuring the displacement of vehicles on predefined paths. In a simple case, a measuring wheel runs with the vehicle or the rolling of a transport wheel is detected by sensors. For more exact solutions, a closed marking that is recognized by a read head is provided along a guideway.

For example, DE 3 825 097 A1 shows such an arrangement, in which a code carrier that carries a closed series of code marks along its longitudinal extent is provided along a path for the position measurement. A code-reading device arranged on the associated vehicle detects a sequence of code marks or the code mark pattern and determines the position of the vehicle. For this purpose, the code-reading device has a number of detection heads or fields that are identical to the pattern length. This solution presents various technical shortcomings, however. For example, such a solution is very cost-intensive and is failure-prone, and cannot be used in areas with large dust or dirt deposits or at junctions, since the outage of only one or a few code marks leads to a reading error.

DE 20 2007 012 798 U1 shows a comparable positioning system, in which the series of coding marks are detected by means of a camera that travels alongside. Although this solution is not quite as cost-intensive, it too is very prone to the influences of dirt and dust. Further, equipping very long sections with code marks is analogously complex and economically disadvantageous.

DETAILED DESCRIPTION

Figure 1:
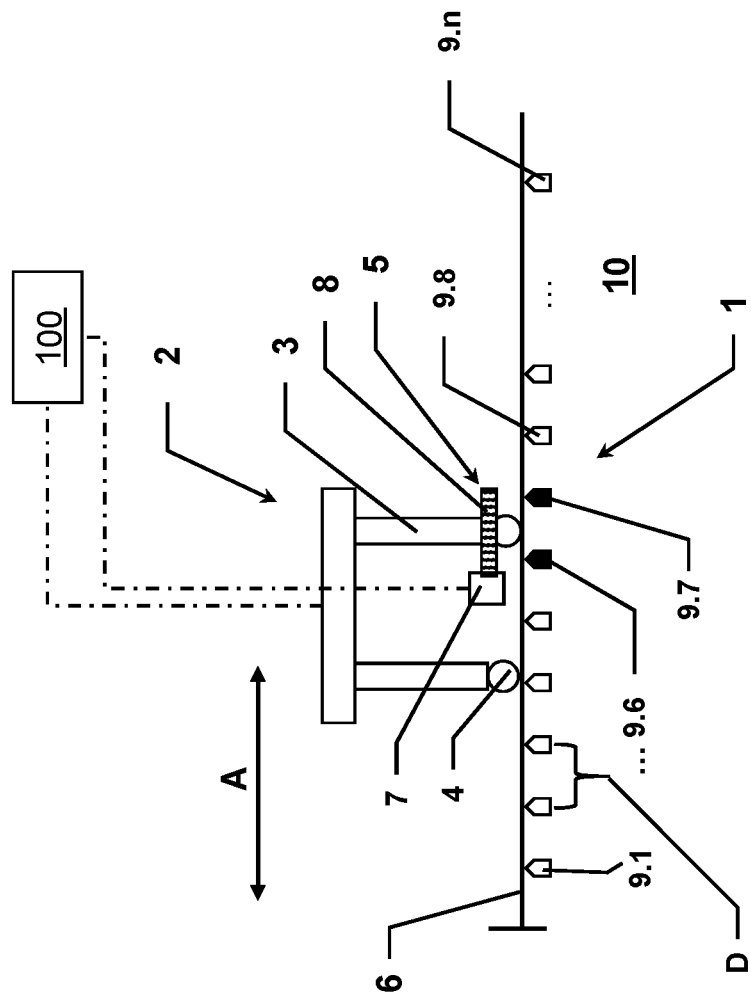
FIG. 1 depicts a schematic side-view of a displacement measurement unit, according to some embodiments.

In various embodiments, the disclosed techniques and apparatuses provide improved displacement measurement techniques that are not susceptible (or less susceptible than prior techniques) to dirt and at the same time are economically advantageous.

In various embodiments, the disclosed displacement measurement unit may be used for the determination of the absolute displacement position of a vehicle movable on a predetermined guideway, where the displacement measurement unit includes a position sensor and one or more locator devices (also referred to as "locators"). The position sensor, in various embodiments, includes an evaluation unit or parts thereof.

In various embodiments, the disclosed techniques include using locators that are arranged spaced apart from each other and at fixed displacement positions along a guideway. Note that, in the present disclosure, the locators are fixed along the guideway and are not moved with the vehicle. As a non-limiting example, in some embodiments the locators are spaced apart from each other along the guideway with a "main distance"—that is, a distance between consecutive locators positioned along the guideway—in the range of 0.5 meters to 20 meters. In one particular embodiment, the main distance is in the range of 0.5 meters to 6 meters. Note that, as described below, the main distance between locators may vary from one locator to the next. For example, in some embodiments, each main distance between consecutive locators may be unique along the guideway.

In various embodiments, the position sensor is attached to the vehicle and driven with it along the guideway. As used herein, the term "vehicle" is used broadly to refer to any transportation equipment that is moved, at least in sections, on a mechanically guided or sensor-guided fixedly predefined path or trajectory, such as a guideway along which a set of locators are arranged. The position sensor may be attached to the vehicle in such a way that the position sensor is guided past or over the locators as the vehicle moves along the guideway. As non-limiting examples, in some embodiments the position sensor may be formed as an inductive position sensor, magnetic position sensor, or magnetostrictive position sensor.

In various embodiments, the disclosed position sensor has at least one sensor head and at least one rod-shaped or cuboidal, elongated detection body. In some embodiments, the detection body is the portion of the position sensor with which a measurement signal is detected, and the sensor head is the portion of the position sensor in which the signal conversion from the detection body is performed. For example, in some such embodiments the measurement signal is physically detected within the detection body of the position sensor and guided to the sensor head. In an installed position, in some embodiments, the detection body has a longitudinal extension (an "extent") parallel to the direction of travel. Further, in some embodiments, the longitudinal extension of the detection body may be equal to or greater than the main distance between two neighboring locators such that the position sensor may detect two neighboring locators simultaneously.

In some embodiments, the locators are arranged into locator pairs. In some such embodiments, the pair distance (that is, the distance between the two associated locators of a single locator pair) may be smaller (and, in some embodiments, significantly smaller) than a "main distance" between multiple pairs of locators. For example, in some embodiments, in order to differentiate a "pair distance" from a "main distance," the pair distance (e.g., the distance between two individual locators in a locator pair) may be 10% or less (e.g., 5%) of the main distance (e.g., the distance between two consecutive locator pairs). In some embodiments, the pair distance lies at least between 5 cm and 10 cm, and, in a particular embodiment, the pair distance is 6 cm to 8 cm.

Based on these "main distances" and "pair distances," note that a route (or a distance of a route or portion thereof) along the guideway may be described or defined in multiple different ways. For example, in some embodiments the route may be described as the sum of the main distances along the route plus the sum of the pair distances along the route. In other embodiments, however, the route may be described as the sum of the main distances, where the measuring point for a main distance for a locator pair lies in the middle of the section that defines the pair distance.

In some embodiments, the distance between individual locators in at least two locator pairs may have different sizes. That is, in some embodiments, a first distance between locators in a first locator pair may be different than a second distance between locators in a second locator pair, and, in some embodiments, both the first and second distances may be different than one or more other distances between individual ones of other locator pairs. Such embodiments may provide various technical benefits. For example, in some such embodiments, the absolute position of the vehicle may be determined and, in particular, may also be redundantly determined or verified, from this unitary pair distance as additional information. Note that, in some embodiments, each individual pair distance is provided only a single time along the guideway and thus makes an immediate position determination of the associated locators possible.

Similarly, in various embodiments the main distances between two locators positioned along the guideway are different. In some embodiments, for example, an individual main distance is provided only a single time along the guideway. This approach may also provide various technical benefits. For example, in such embodiments an item of position information may be obtained from the detection of an individual main distance.

Note that, in some embodiments, individual locators may be identified using an additional (and thus redundant) detection system. In such embodiments, a detection at points, not in sections, may be performed. For example, in some embodiments a data read head is provided on the vehicle, in particular on or in the vicinity (e.g., the immediate vicinity) of the position sensor. In various embodiments, data indicating the position of this data read head relative to the position sensor may be stored in a suitable data storage location as a dataset.

In some embodiments, a data "tag" that can be read by the data read head is arranged on at least one of the locators. For example, in various embodiments, the data read head is configured to receive and digitally process information or data from a data tag that is arranged on a locator. In a particular embodiment, for example, one or more data tags may be arranged on each of several different locators. In some embodiments, the data tag includes a direct or indirect item of information associated with its absolute position or that of the associated locator. In various embodiments, the data tag and the data read head here are parts of a contactless data-transmission system, in particular of a contactless data- and energy-transmitting system, such as RFID, NFC, Bluetooth, etc. In one non-limiting embodiment that is particularly robust and economically efficient, the data read head is an RFID read head and at least one of the locators includes an RFID tag. In various embodiments, the data read head is a read/write head configured to perform both read and write operations such that data, and in particular position data, may be written on the at least one data tag of a locator by the data read/write head.

Note that, in some embodiments, all of the locators may have permanent magnets that generate the maximum possible field strength, where all locators are constructed substantially identically and have the same field strength (or substantially the same field strength, for example within a tolerance of 5%, 10% or other suitable threshold). In other embodiments, however, at least two locators may have magnetic field strengths that are different from each other. Further, in some embodiments, the different field strengths of several locators in sections on the guideway may yield a measurement value pattern, in particular a field-strength pattern, that may be detected by the position sensor. Accordingly, in such embodiments, an individual locator may be bijectively identified by the system from the field strength, and in particular from the maximum of the field strength when driven over or past.

In some embodiments, the position sensor is a magnetostrictive position sensor. In some such embodiments, the magnetostrictive position sensor includes a detection body and a detection head, where the detection body includes an elongated ferromagnetic core element and an electrical line, and where the sensor head includes a signal converter and is formed in such a way that a magnetostrictive effect can be evaluated as an electrical signal. In some embodiments, a circular magnetic field is generated by via current pulses through the electrical line (which may be formed from copper, silver, nickel, a suitable mixture thereof, or using any other suitable conductive material or alloy). In various embodiments, the permanent magnets of the locators generate magnetic field lines that run orthogonally to the pulsed magnetic field and are bundled together in the core element. In such embodiments, the magnetic fields superimposed in this way generate an elastic deformation in the core element that spreads out in the manner of a wave towards both sides. In various embodiments, the deformation or wave running towards the free end of the core element is typically eliminated there using a damping element. Further, in various embodiments, the deformation or wave running towards the sensor head is detected using a signal converter and is converted into an electrical signal for further processing.

In an alternative embodiment, the position sensor may be formed as an inductive position sensor that includes at least two independent oscillating circuits. In some such embodiments, the independent oscillating circuits are actuatable with different electrical values or frequencies, with the result that locators can be determined position-accurately.

Further, in some embodiments, the position sensor is a Hall effect position sensor that is configured to determine the position of an individual locator using magnetic locators (for example, magnetic locators with respectively distinguishable field strengths). In some such embodiments, the position sensor may also be constructed of a plurality of individual Hall effect sensors that are carried together on an elongated carrying structure.

Note that, in instances in which a route is particularly long, the large number of locators necessary may be economically disadvantageous, particularly if the locators additionally need to be protected structurally from mechanical impairments or cannot be attached at the required minimum distance in all section areas. This could be the case, for example, at junctions or in loading areas, in which there is routinely a lot of dirt and covering. To address such situations, in various embodiments of the present disclosure, the position sensor is constructed from at least two parts and can be attached to the vehicle one part behind the other at a distance in the direction of travel. In some such embodiments, the first part of the position sensor may be operatively connected to a first locator in normal operation and the second part of the position sensor is, at the same time, operatively connected to a second locator, where the first and second locators are normally not directly neighboring. The distance between the first and second measurement position sensor parts may vary according to different embodiments. In some embodiments, this distance is dependent on the size of the vehicle or the attachment possibilities of associated carrying structures, such as optional carrying arms. As used herein, the term "detection range" is used to refer to a distance at which the position sensor is capable of detecting a locator. When a locator is within the detection range of the position sensor, there is an "operative connection" such that physical effects act between the locator and position sensor and can be evaluated.

Note that, in various embodiments, the discussion herein relating to main distances and pair distances for locators may also apply to split position sensors. For example, in some embodiments the distances of the locators are different, where the differences are unitary in such a way that different locators are detected simultaneously by the first and second position sensor parts attached to the vehicle and separated from one another by a particular distance. In some such embodiments, the respective, unique absolute position on the guideway can be detected or derived therefrom based on the simultaneous detection of the two different locators by the two position sensor parts.

As described in greater detail below, various disclosed embodiments include a transporting system, which includes a displacement measurement unit and a vehicle movable on a defined guideway formed as a section of track. In various embodiments, the vehicle is a crane or crane truck that is guided standing or suspended. In some embodiments, the guideway may be considered to be part of the transporting system.

Further, various embodiments include a method for operating a transporting system. For example, in various embodiments, the method includes storing, in a data storage device, the distances of the locators, the locator pairs, the longitudinal extension of the at least one position sensor, or the position sensor parts. In various embodiments, a control and evaluation unit is operable to determine the absolute position of the vehicle or of the position sensor relative to the guideway, as described in greater detail below. Note that, in various embodiments, the control and evaluation unit may be formed of one or more sub-units that are configured to exchange data with one another (e.g., via a wired data bus, a wireless communication connection (such as Bluetooth, Wi-Fi, NFC, etc.)). Note that, in some such embodiments, the individual sub-units may be arranged either centrally or partially on the vehicle (or the position sensor).

In some embodiments, a redundant detection is performed to verify the absolute position of the vehicle or of the position sensor or at least one part of the position sensor. For example, in some embodiments the redundant detection is performed by utilizing the location of a locator relative to the moving position sensor (or position sensor part) and at least one of the following items of information: the number of locators detected or driven over from a starting position, the position of a locator pair from an assignable, unitary pair distance, the position of two neighboring locators from an assignable, unitary main distance, or the position of two locators from an assignable, unitary main distance of these two locators (for example if the two locators are detected at the same time by two position sensors or position sensor parts spaced apart on the vehicle at a distance). In some such embodiments, detections may be performed independently and in parallel, and the accuracy of the position information may be checked and, if necessary, corrected. Further, in some embodiments, each locator of a locator pair is recognized separately such that a redundant position determination may be performed.

In some embodiments, an incorrect item of locator information may be recognized and automatically corrected by the control and evaluation unit using plausibility methods, for example when a neighboring or subsequent locator (or a neighboring or subsequent locator pair) is recognized by the position sensor. Such embodiments may be particularly advantageous in instances in which a locator has been covered by metal or otherwise functionally impaired. In some embodiments, the control and evaluation unit sends a notice to a monitoring or maintenance unit that is configured to perform such a procedure.

In some embodiments, the disclosed techniques include detecting at least one locator using a data tag that is arranged on or in the locator. For example, in some embodiments a data read head is attached to the vehicle and data associated with the detected data tag (e.g., an absolute position on the guideway) is transmitted to the control and evaluation unit. In some such embodiments, the absolute position may be provided as absolute displacement information or an using any suitable identifier (e.g., an alphanumeric or binary code).

In some embodiments, the data-read head is configured to perform both data-read and data-write operations such that data may be written to at least one of the data tags of the locators by the data-read/write head (as the vehicle carrying the data-read/write head passes the locator, for example). Such embodiments may be advantageous in addressing the need to define locators, and thus to write on the data tags included in the locators, after the locators' installation along the guideway. One advantage of such an embodiment is that the absolute positions or sequence of the locators (or of the locator pairs) may be performed automatically after the start-up of a guideway with a vehicle using a calibration and set-up journey. In some such embodiments, the absolute positions or the sequence of the locators are stored in a data storage device of the control and evaluation unit and utilized for subsequent journeys of the vehicle. A calibration and set-up journey may be repeated as-needed to validate the displacement measurement system. In various embodiments, the calibration and set-up journey may be performed at slow speeds, with the correct seating of all components, and during ideal conditions, for example during periods of no (or limited) moisture, dirt, dust, etc. One advantage of such embodiments is that, during the positioning of the locators, consideration can be given to local peculiarities, such as guideways, areas of debris and the like, because, in various embodiments, effectively only the maximum and minimum main and pair distances need to be strictly complied with.

Note that, in many instances, it may be desirable to detect the adherence of the vehicle to the guideway or to detect lateral deviations of the vehicle from its route as quickly as possible. Accordingly, in some embodiments, the operating principle strength (e.g., the actual operating principle strength) is determined when the position sensor is driven over or past a locator. Based on this actual operating principle strength, the disclosed techniques include determining the extent of the deviation, in the direction transverse to the route, of the position sensor relative to the respective locator. Stated differently, in various embodiments the control and evaluation unit is configured to perform a comparison of the actual operating principle strength with a target or expected operating principle strength. In such embodiments, a warning or control signal may be initiated depending on the degree of any such deviation. Accordingly, in various embodiments the predetermined guideway (or target guideway) is thus monitored without the need of provisioning additional sensors or components, even in instances in which the guideway is not formed in a straight line.

Additionally, in some embodiments, the determination or validation of the absolute position of the vehicle may be performed using the detection or evaluation by at least one of the following detection steps: detection of the travel speed of the vehicle and comparison with a target duration or expected time until a defined locator is reached at known travel speed, detection and evaluation of a target duration of the detection of a pair distance of a locator pair at known travel speed, or detection and evaluation of relevant engine operating data of the vehicle, such as travel paths, travel frequencies, and incremental data of an engine driving the vehicle. The determination of the absolute position of the vehicle may thus be carried out redundantly multiple times very easily, according to such embodiments, which may provide a great assurance of the authenticity and accuracy of necessary control and adjustment data.

Further details of various non-limiting embodiments are now described in more detail with reference to example embodiments depicted in the Drawings. In FIG. 1, a block diagram depicts a displacement measurement unit 1 attached to a vehicle 2 having vehicle body 3, according to various embodiments. In the depicted embodiment, the displacement measurement unit 1 includes a position sensor 5, with a sensor head 7 and an elongated detection body 8, positioned at the level of the running wheel 4 of the vehicle 2. In this disclosure, the term "vehicle body" is used broadly to refer to any vehicle part or component of the vehicle 2 to which or on which a position sensor 5 may be attached.

In the depicted embodiment, vehicle 2 is located on a guideway 6, on which it may be driven in the direction of travel A using one or more engines included in vehicle 2 (not explicitly shown, for clarity). (Note that, in the non-limiting embodiment depicted in FIG. 1, various common components such as drive motors, steering elements, or work components (e.g., loading area, processing and handling kits, etc.) are not represented, for clarity.) In various embodiments, the vehicle 2 includes (or has attached thereto) at least part of a control and evaluation unit 100, to which various relevant components, including the position sensor 5 or its control head 7, are connected (using either wired or wireless connection mediums) so as to carry data (as represented in FIG. 1 with the dot-dash lines).

Guideway 6 may be a rail, in some non-limiting embodiments. In the depicted embodiment, along the guideway 6, locators 9.1-9.n are attached at defined, optionally regular, main distances D by setting them at least partially into the floor or ground 10. In some embodiments, each locator 9.1-9.n has a strong permanent magnet (not explicitly shown in FIG. 1, for clarity), the magnetic field of which is detected by the position sensor 5 when the vehicle 2, and therefore the position sensor 5, is brought into proximity of one or more locators 9 (e.g., in embodiments in which position sensor 5 is formed as a magnetostrictive sensor). For example, in the embodiment shown in FIG. 1, the position sensor 5 detects the two locators 9.6 and 9.7.

Figure 2:
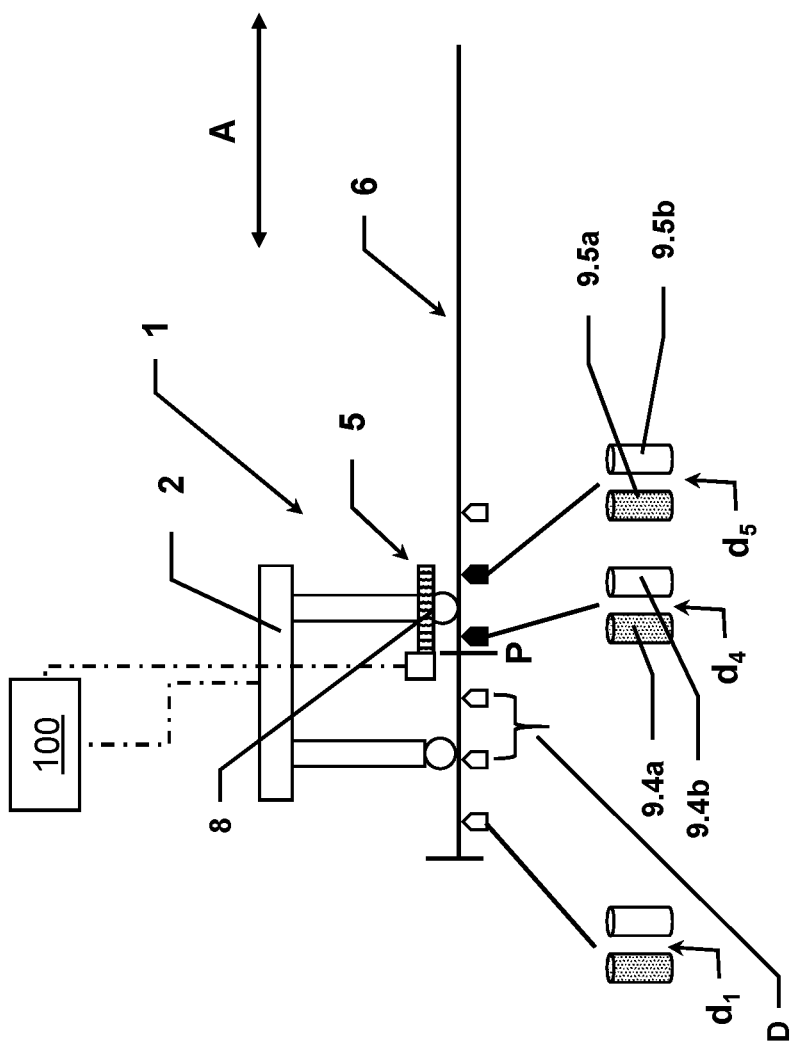
FIG. 2 depicts a schematic side-view of an alternative displacement measurement unit, according to some embodiments.

FIG. 2 depicts a non-limiting embodiment in which the locators 9.1-9.6 are arranged at identical main distances D along the guideway 6. Further, in the depicted embodiment, the locators 9.1, 9.4 and 9.5 are formed as locator pairs 9.1a-b, 9.4a-b and 9.5a-b. Such an embodiment may provide technical benefits, for example in instances in which the locator pairs are positioned in particularly sensitive sections of the guideway 6 in which a redundant detection is desired, such as loading and unloading areas.

In the depicted embodiment, the position sensor 5 is located at the guideway position P and covers the locator pairs 9.4a-b and 9.5a-b completely, and therefore detects a total of four individual locators. In FIG. 2, the locators 9.4a and 9.4b are spaced apart from each other by a defined pair distance $d_4$, and the locators 9.5a and 9.5b are spaced apart from each other by a defined pair distance $d_5$. In various embodiments, $d_4$ may be equal to or substantially the same size as $d_5$. In one non-limiting example, using the control and evaluation unit 100, the position may be recognized by the presence of the pair distances $d_4$ and $d_5$, which in one non-limiting embodiment may be defined as 7.5 cm, redundantly in respect of the absolute position of the four locators.

Figure 3:
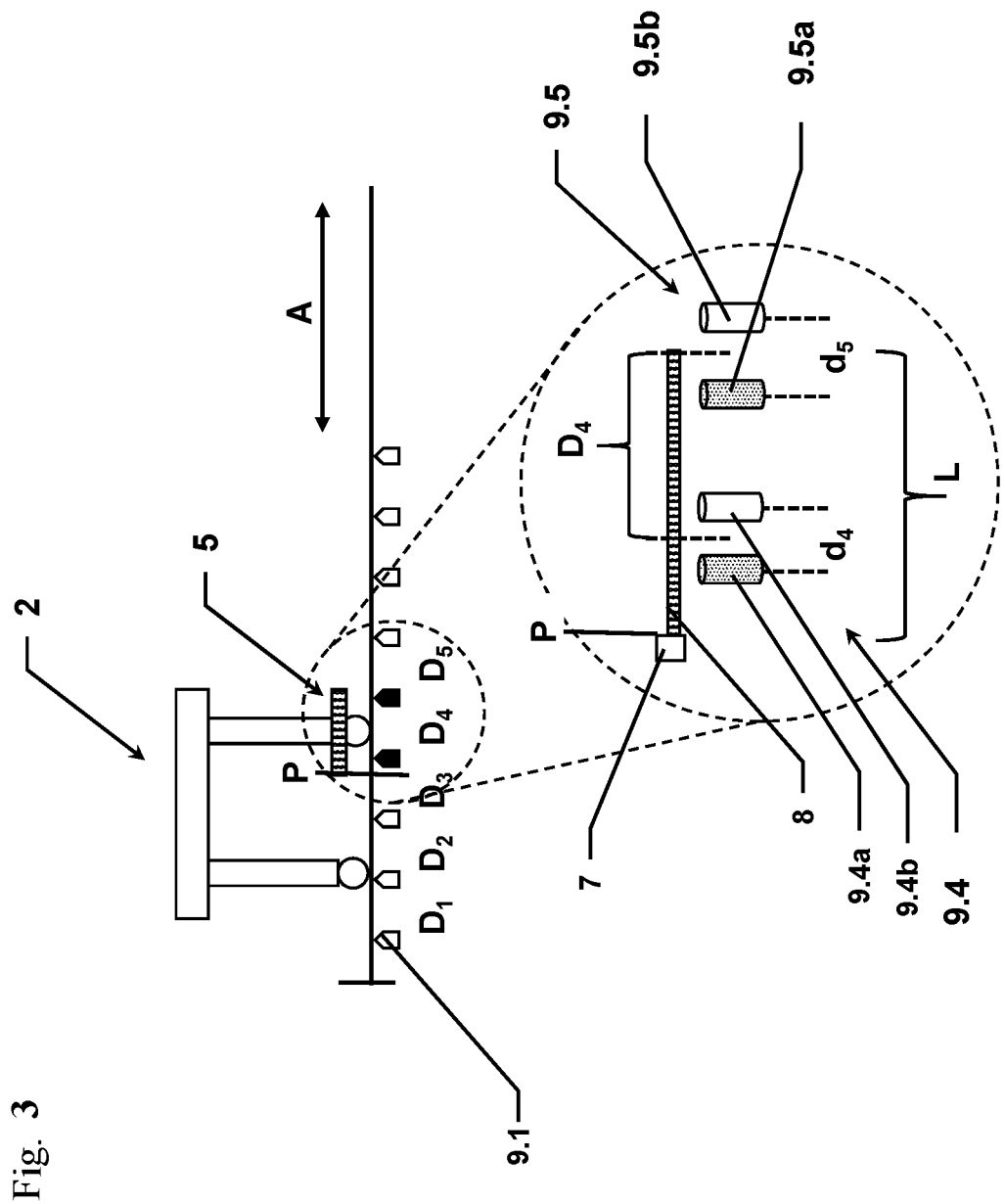
FIG. 3 depicts a detailed representation of a position sensor and locator pairs, according to some embodiments.

Referring now to FIG. 3, the block diagram shows an embodiment in which the distances $d_4$ and $d_5$ between respective pairs of locators 9.4a-b and 9.5a-b are different. That is, in FIG. 3, the distance $d_4$ between locator 9.4a and 9.4b is different than the distance $d_5$ between 9.5a and 9.5b. As non-limiting examples, the pair distances $d_4$ and $d_5$ may differ in terms of size by 2 mm, 3 mm, 5 mm, etc., according to various embodiments.

In the embodiment of FIG. 3, the position sensor 5 is located at guideway position P. The main distance $D_4$ (as shown in the lower detailed representation) is defined by the two central positions between the locator pairs 9.4a-b and 9.5a-b. In this embodiment, the longitudinal extent L of the detection body 8 overhangs the locator pair 9.4a-b and the first locator 9.5a of the locator pair 9.5a-b. In such an embodiment, the absolute position of the vehicle 2 or of the position sensor 5 may be measured redundantly multiple times and verified on the basis of one or more stored dimensions (e.g., longitudinal extent L, absolute position of the locator 9.4a and 9.4b, pair distance $d_4$, or absolute position of the locator 9.5a). (Note that the control and evaluation unit is not explicitly depicted in FIG. 3, for clarity).

Figure 4:
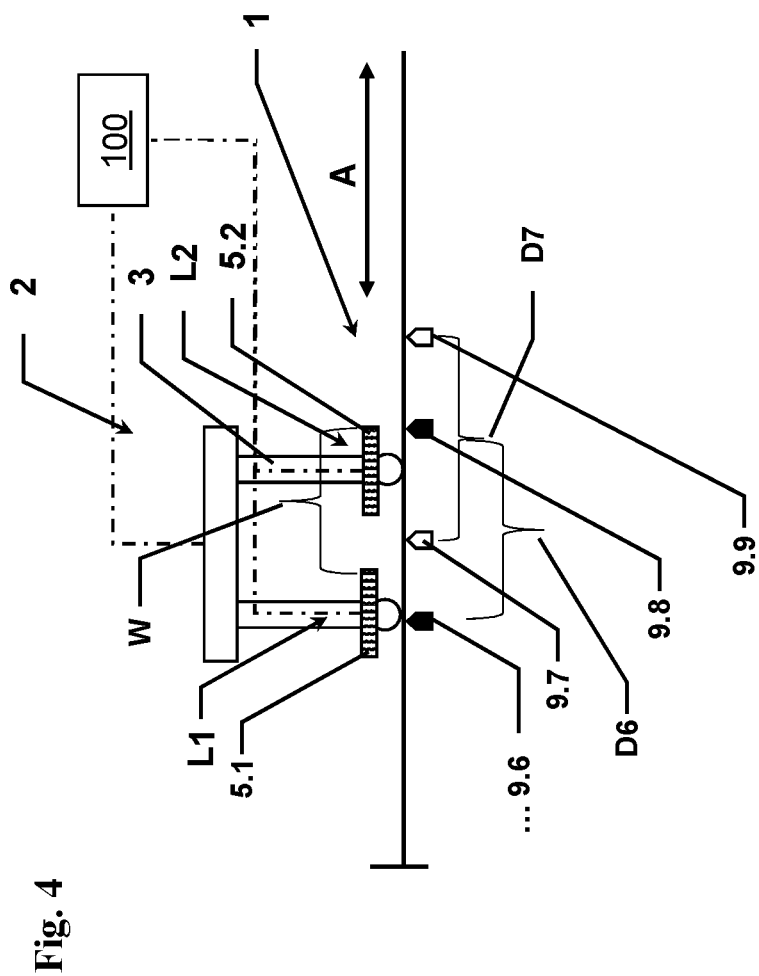
FIG. 4 depicts a displacement measurement unit with a split position sensor, according to some embodiments.

FIG. 4 depicts a non-limiting embodiment of displacement measurement unit 1 in which the position sensor 5 consists of a first position sensor part 5.1 and a second position sensor part 5.2. In this embodiment, the two position sensor parts 5.1 and 5.2 are separated from each other by a distance W and attached to the vehicle 2 on the front and back of the vehicle body 3. In various embodiments, the position sensor parts 5.1, 5.2 are full-featured position sensors that function like a measurement sensor via the evaluation unit 100 (or one or more integrated processor units). Such an embodiment may provide various technical advantages. For example, in some such embodiments, very large sections may be spanned without dimensioning the measurement sensor itself to be very large. Furthermore, the distance W and the two extension lengths L1 and L2 of the detection bodies are also further variables which can be made useful for the multiple, redundant detection of the absolute position of the vehicle 2. Note that, in various embodiments, extension lengths L1, L2 may be the same size or have different sizes. Further note that, although only two sensor parts 5.1 and 5.2 are shown on vehicle 2 in FIG. 4, this embodiment is depicted merely as one non-limiting embodiment. In other embodiments, additional sensor parts may be included on or attached to vehicle 2, as desired, which may further facilitate redundant detection of the absolute position of the vehicle 2.

In the split position sensor embodiment depicted in FIG. 4, note that sensor part 5.1 is positioned over locator 9.6 and that sensor part 5.2 is positioned over locator 9.8. Accordingly, in this embodiment, the main distance D6 is not defined by two neighbouring locators covered by a single detection body (as discussed above with reference to FIG. 3, for example). Instead, in this embodiment, the main distance D6 is defined by the distance of between locator 9.6 (covered by sensor part 5.1) and locator 9.8 (covered by sensor part 5.2). That is, in some embodiments, this main distance may be defined by the distance between non-neighbouring locators that are covered and detected at the same time by the two position sensor parts 5.1 and 5.2 (via their respective detection bodies). Analogously, the main distance D7 is defined by the distance between the locator 9.7 and 9.9, which, in the depicted embodiment, are not covered by either of the sensor parts 5.1 or 5.1. Further, in various embodiments, the main distances or pair distances may also have different sizes. In some such embodiments, at least one of the position sensors 5 may be dimensioned with respect to the extent of its detection body 8 such that the detection body 8 can detect more than one locator simultaneously (not separately shown, for clarity).

The following set ("Set A") of numbered clauses set out various non-limiting embodiments disclosed herein:

Set A:

A1. A displacement measurement unit (1) for the determination of the absolute displacement position of a vehicle (2) that is movable on a predetermined guideway (6) in a direction of travel (A), wherein the displacement measurement unit (1) comprises a position sensor (5) and a plurality of locators (9.1 ... 9.$n$), wherein the position sensor (5) comprises an evaluation unit (100) or can be connected thereto so as to carry data;

wherein the plurality of locators (9.1 ... 9.$n$) are arranged spaced apart from each other and at fixed displacement positions along the guideway (6); and wherein the position sensor (5) is attached to the vehicle (2) and can be driven with it along the guideway (6), and wherein the position sensor (5) can be attached to the vehicle in such a way that it can be guided in the detection range of the locators (9.1 ... 9.$n$) past the latter, and wherein the position sensor (5) is an inductive, magnetic and/or magnetostrictive position sensor.

A2. The displacement measurement unit (1) of clause A1, characterized in that the position sensor (5) comprises at least one sensor head (7) and at least one detection body (8), wherein in the installed position the detection body (8) has an extent (L) parallel to the direction of travel (A) and opposite the locators (9.1 ... 9.$n$) which is equal to or greater than the main distance (D) of two neighbouring locators (9.1 ... 9.$n$).

A3. The displacement measurement unit (1) according to one of clauses A1 or A2, characterized in that the locators (9.1 ... 9.$n$) are arranged along the guideway (6) with a main distance (D) of from 0.5 m to 20 m, in particular with a main distance (D) of from 0.5 m to 6 m.

A4. The displacement measurement unit (1) according to any of the preceding clauses, characterized in that at least one locator (9.1 ... 9.$n$) is formed as a locator pair (9.4a/b, 9.5a/b), wherein the pair distance (d) of the two locators of a locator pair (9.4a, 9.4b; 9.5a, 9.5b) is much smaller than the main distance (D), primarily is smaller than 10% of the main distance (D), in particular smaller than 5%.

A5. The displacement measurement unit (1) according to clause A4, characterized in that at least one of the pair distances (d) of two locator pairs (9.4a/b, 9.5a/b) is different, in particular an individual pair distance ($d_1$ ... $d_n$) is provided only a single time along the guideway (6).

A6. The displacement measurement unit (1) according to any of the preceding clauses, characterized in that at least the main distances ($D_1$ ... $D_n$) between two locators (9.1 ... 9.$n$) are different, in particular an individual main distance ($D_1$ ... $D_n$) is provided only a single time along the guideway (6).

A7. The displacement measurement unit (1) according to any of the preceding clauses, characterized in that a data read head is arranged on the vehicle (2), in particular on the drivable position sensor (5), and a data tag that can be read by the data read head is arranged on at least one locator (9.1 ... 9.$n$), in particular one data tag is arranged on each of several locators (9.1 ... 9.$n$), wherein the at least one data tag comprises an item of information about its and/or the absolute position of the associated locator (9.1 ... 9.$n$) and this item of information can be read by the data read head, and wherein the data tag and data read head are part of a contactless data-transmission system, in particular of a contactless data- and energy-transmitting system.

A8. The displacement measurement unit (1) according to clause A7, characterized in that the data read head is an RFID read head and the at least one locator (9.1 ... 9.$n$) comprises an RFID tag.

A9. The displacement measurement unit (1) according to either of clauses A7 or A8, characterized in that the data read head is formed as a data read/write head and data, in particular position data, can be written on at least one data tag of a locator (9.1 ... 9.$n$) by the data read/write head.

A10. The displacement measurement unit (1) according to any of the preceding clauses, characterized in that at least two locators (9.1 ... 9.$n$) have magnetic field strengths different from each other, in particular the different field strengths of the locators (9.1 ... 9.$n$) at least in sections on the guideway (6) yield a measurement value pattern, in particular field-strength pattern, that can be identified by means of the position sensor (5).

A11. The displacement measurement unit (1) according to any of the preceding clauses, characterized in that the locators (9.1 ... 9.$n$) and/or locator pairs (9.4a, 9.4b; 9.5a, 9.5b) can be determined position-accurately by the position sensor (5), wherein the position sensor (5):

a) is formed as a magnetostrictive position sensor, wherein an elongated ferromagnetic core element and an electrical line are arranged in the at least one detection body (8), and wherein the sensor head (7) comprises a signal converter and is formed in such a way that a magnetostrictive effect can be evaluated as an electrical signal;

b) is formed as an inductive position sensor, comprising at least two independent oscillating circuits, which are actuatable with different electrical values and/or frequencies, with the result that locators (9.1 ... 9.$n$) can be determined position-accurately; or c) is formed as a magnetic position sensor, which can determined by means of Hall effect locators (9.1 ... 9.$n$), in particular can determine with respectively distinguishable field strengths.

A12. The displacement measurement unit (1) according to any of the preceding clauses, characterized in that the position sensor (5) is at least two-part and can be attached to the vehicle (2) one part behind the other at a distance (W) in the direction of travel (A) in such a way that:

the first part of the position sensor (5.1) is operatively connected to a first locator (9.1 ... 9.$n$−1) in normal operation, and the second part of the position sensor (5.2) is at the same time operatively connected to a second locator (9.2 . . . 9.*n*+1).

A13. The displacement measurement unit (1) according to clause A12, characterized in that the distances of the locators (9.1 . . . 9.*n*) are different, wherein the differences are unitary in such a way that when different locators (9.1 . . . 9.*n*) are detected simultaneously by the first and second position sensor parts (5.1, 5.2) spaced apart from each other at the distance (W), the respective, unique absolute position on the guideway (6) can at least sometimes be detected and/or derived therefrom.

A14. A transporting system comprising a vehicle (2) movable guided on a defined guideway (6), in particular on a guideway (6) formed as a section of track, characterized in that the transporting system comprises a displacement measurement unit (1) according to any of the preceding clauses A1-A13, wherein the vehicle (2) is in particular a crane, railcar, or crane truck.

A15. A transporting system according to clause A14, characterized in that the transporting system comprises the guideway (6).

A16. A method for operating a transporting system, characterized in that the transporting system is formed according to either of clauses A14 or A15, wherein at least one data storage device and a control and evaluation unit (100) are provided, wherein the distances of the locators (9.1 . . . 9.*n*), of the locator pairs (9.4*a/b*, 9.5*a/b*), and/or the longitudinal extent of the at least one position sensor (5) are stored in the data storage device, and wherein the absolute position of the vehicle (2) and/or of the position sensor (5) relative to the guideway (6) is determined by means of the control and evaluation unit (100).

A17. The method according to clause A16, characterized in that, for the determination and/or verification of the absolute position of the vehicle (2) and/or of the position sensor (5), the location of a locator (9.1 . . . 9.*n*) relative to the at least one moving position sensor (5) and at least one of the following items of information is utilized:

number of locators (9.1 . . . 9.*n*) detected or driven over from a starting position, position of a locator pair (9.4*a/b*, 9.5*a/b*) from an assignable, unitary pair distance ($d_1$ . . . $d_n$), position of two neighbouring locators (9.1 . . . 9.*n*) from an assignable, unitary main distance ($D_1$ . . . $D_n$), and/or position of two locators (9.1 . . . 9.*n*) from an assignable, unitary distance of these two locators (9.1 . . . 9.*n*) if they are detected at the same time by two position sensors (5.1, 5.2) or position sensor parts spaced apart on the vehicle (2) at a distance (W).

A18. The method according to either of clauses A16 or A17, characterized in that each locator (9.1 . . . 9.*n*) of a locator pair (9.4*a*, 9.4*b*; 9.5*a*, 9.5*b*) is recognized separately and this results in a double redundancy.

A19. The method according to any of clauses A16-A18, characterized in that an incorrect item of locator information is automatically corrected by the control and evaluation unit (100), as soon as a neighbouring and/or subsequent locator (9.1 . . . 9.*n*) and/or a neighbouring and/or subsequent locator pair (9.4*a*, 9.4*b*; 9.5*a*, 9.5*b*) is recognized by the position sensor (5).

A20. The method according to any of clauses A16-A19, characterized in that at least one locator (9.1 . . . 9.*n*) is detected by means of a data TAG as absolute position on the guideway (6), which by a data read head attached to the vehicle (2), wherein the absolute position can be effected as absolute displacement information and/or an identifier of any nature, in particular in the form of numbers, letters or a binary code.

A21. The method according to clause A20, characterized in that the data read head is a data read/write head and method-relevant data are written at least once on the data tag of the at least one locator (9.1 . . . 9.*n*) by the data read/write head.

A22. The method according to clause A21, characterized in that the absolute positions and/or sequence of the locators (9.1 . . . 9.*n*) and/or of the locator pairs (9.1*a/b*, . . . ) are affected automatically after the start-up of a guideway (6) with a vehicle (2) using a calibration and set-up journey, and wherein the absolute positions and/or sequence detected in such a way are stored in a data storage device of the control and evaluation unit (100) and utilized for further journeys of the vehicle (2).

A23. The method according to any of clauses A16-A22, characterized in that the operating principle strength, in particular the maximum operating principle strength (actual operating principle strength), is a feature of the degree of the deviation of the position sensor (5) relative to the respective locator (9.1 . . . 9.*n*), when driven over or past, transverse to the guideway (6), and wherein the control and evaluation unit (100) initiates warning and/or control signals by comparing the actual operating principle strength with a target operating principle strength.

A24. The method according to any of clauses A14-A23, characterized in that the determination and/or validation of the absolute position of the vehicle (2) is additionally performed using the detection and/or evaluation by at least one of the following detection steps:

a) detection of the travel speed of the vehicle (2) and comparison with a target duration or expected time until a defined locator (9.1 . . . 9.*n*) is reached, b) detection and evaluation of a target duration of the detection of a main distance at known travel speed, c) detection and evaluation of a target duration of the detection of a pair distance (d, $d_1$ . . . $d_n$) of a locator pair (9.1 . . . 9.*n*, 9.4*a/b*, 9.5*a/b*) at known travel speed, d) detection and evaluation of relevant engine operating data of the vehicle (2), in particular of travel paths, travel frequencies and incremental data of an engine driving the vehicle (2).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Note that, as used in the claims in this or another United States patent application based on this disclosure, the term "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A displacement measurement unit configured to determine a displacement position of a vehicle along a guideway, wherein the displacement measurement unit comprises:
    a plurality of locator devices that are distributed at fixed displacement positions along the guideway, wherein a given locator device, of the plurality of locator devices, includes a magnetic element configured to produce a corresponding magnetic field;
    a position sensor attached to the vehicle, wherein the position sensor is configured to detect a magnetic field produced by one or more of the plurality of locator devices within a detection range of the position sensor; and
    a control unit configured to:
        determine the displacement position of the vehicle along the guideway, and
        determine a lateral deviation of the position sensor, in a direction transverse to the guideway, relative to the given locator device.

2. The displacement measurement unit of claim 1, wherein the plurality of locator devices are arranged along the guideway such that a main distance (D) between consecutive locator devices of the plurality of locator devices is in a range of 0.5 meters to 20 meters.

3. The displacement measurement unit of claim 2, wherein a first locator device of the plurality of locator devices is formed as a locator pair that includes a first locator and a second locator, wherein a pair distance (d) between the first locator and the second locator is smaller than the main distance (D).

4. The displacement measurement unit of claim 3, wherein the main distance is in a range of 0.5 meters to 6 meters, and wherein the pair distance (d) is less than 10% of the main distance (D).

5. The displacement measurement unit of claim 1, wherein one or more locator devices, of the plurality of locator devices, are formed as locator pairs, and wherein a first locator pair, of the one or more locator devices, has a first pair distance that is unique relative to pair distances associated with the one or more locator devices.

6. The displacement measurement unit of claim 5, wherein each of the pair distances associated with the one or more locator devices is provided only a single time along the guideway.

7. The displacement measurement unit of claim 1, wherein the plurality of locator devices are separated along the guideway by a plurality of main distances ($D_1 \ldots D_n$), and wherein a first main distance between first and second locator devices, of the plurality of locator devices, is provided a single time along the guideway.

8. The displacement measurement unit of claim 1, wherein at least two locator devices of the plurality of locator devices have respective magnetic elements that produce magnetic fields having different magnetic field strengths.

9. The displacement measurement unit of claim 8, wherein the different magnetic field strengths, of the at least two locator devices, form a field-strength pattern in a section of the guideway.

10. A system, comprising:
    a vehicle; and
    a displacement measurement unit configured to determine a displacement position of the vehicle along a guideway, wherein the displacement measurement unit includes:
        a plurality of locator devices that are arranged at fixed displacement positions along the guideway;
        a position sensor attached to the vehicle and configured to detect one or more of the plurality of locator devices within a detection range of the position sensor; and a control unit configured to:
   determine the displacement position of the vehicle along the guideway, and
   determine a lateral deviation of the position sensor, in a direction transverse to the guideway, relative to a given locator device.

11. The system of claim 10, wherein the position sensor includes a first portion and a second portion, wherein the first portion is attached to the vehicle in a position that is in front of the second portion such that the first and second portions of the position sensor are separated by a distance (W) in a direction of travel (A).

12. The system of claim 11, wherein each main distance ($D_1 \ldots D_n$) separating consecutive locator devices of the plurality of locator devices is different such that, based on simultaneous detection, by the first and second portions of the position sensor, of different locator devices of the plurality of locator devices, the system is configured to determine a position of the vehicle along the guideway.

13. The system of claim 10, wherein the position sensor is one of the following types of position sensors:
   a magnetostrictive position sensor that includes an elongated ferromagnetic core element and an electrical line arranged in a detection body (8);
   an inductive position sensor that includes at least two independent oscillating circuits, wherein the induction position sensor is configured to detect one or more of the plurality of locator devices within the detection range of the position sensor; or a magnetic position sensor.

14. The system of claim 10, further comprising:
   a data-read head attached to the vehicle, wherein a first locator device, of the plurality of locator devices, includes a data tag that includes position data indicative of a position of the first locator device, and wherein the data-read head is configured to read the position data from the data tag during a contactless data-transmission operation.

15. The system of claim 14, wherein the data-read head is an RFID read head and the data tag of the first locator device is an RFID tag.

16. The system of claim 14, wherein the data-read head is a data-read/write head configured to perform both data-read and data-write operations, and wherein the data-read/write head is configured to write the position data to the data tag of the first locator device.

17. A displacement measurement unit, comprising:
   a plurality of locator devices, wherein a given locator device, of the plurality of locator devices, includes a magnetic element configured to produce a corresponding magnetic field;
   a position sensor that is configured to mount onto a vehicle, wherein the position sensor includes a detection body and a sensor head, wherein the position sensor is configured to:
      detect a magnetic field produced by one or more of the plurality of locator devices; and
      generate a measurement signal based on the detected magnetic field; and
   a control unit that is configured to determine a displacement position of the vehicle along a guideway based on the measurement signal and determine a lateral deviation of the position sensor, in a direction transverse to the guideway, relative to a given locator device.

18. The displacement measurement unit of claim 17, wherein the position sensor is one of: an inductive sensor, a magnetic sensor, or a magnetostrictive sensor; and
   wherein the detection body includes a longitudinal extension that, in a mounted position on the vehicle, is parallel to a direction of travel (A) of the vehicle.

19. The displacement measurement unit of claim 17, wherein at least two of the plurality of locator devices have respective magnetic elements that produce magnetic fields having different magnetic field strengths.

20. The displacement measurement unit of claim 17, wherein the position sensor is one of the following types of position sensors:
   a magnetostrictive position sensor that includes an elongated ferromagnetic core element and an electrical line arranged in the detection body;
   an inductive position sensor that includes at least two independent oscillating circuits, wherein the induction position sensor is configured to detect one or more of the plurality of locator devices within a detection range of the position sensor; or
   a magnetic position sensor.

* * * * *